(12) United States Patent
Okada et al.

(10) Patent No.: US 7,656,279 B2
(45) Date of Patent: Feb. 2, 2010

(54) GLASS BREAKAGE DETECTING SENSOR

(75) Inventors: Takashi Okada, Kariya (JP); Katsuyoshi Shirai, Anjo (JP); Koji Aoki, Nagoya (JP); Hironori Ochiai, Chiryu (JP); Toshiro Maeda, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 202 days.

(21) Appl. No.: 11/882,487

(22) Filed: Aug. 2, 2007

(65) Prior Publication Data
US 2008/0030310 A1 Feb. 7, 2008

(30) Foreign Application Priority Data
Aug. 2, 2006 (JP) .............................. 2006-210434
Apr. 16, 2007 (JP) .............................. 2007-106638

(51) Int. Cl.
*B60R 25/10* (2006.01)
*G01B 7/16* (2006.01)
(52) U.S. Cl. ..................... 340/426.27; 340/550; 73/781
(58) Field of Classification Search ............ 340/426.27, 340/550; 73/862.044, 862.045, 774, 775, 73/776, 781
See application file for complete search history.

(56) References Cited

U.S. PATENT DOCUMENTS

| | | | | |
|---|---|---|---|---|
| 3,863,250 A | * | 1/1975 | McCluskey, Jr. ............ 340/550 |
| 4,064,744 A | * | 12/1977 | Kistler ..................... 73/766 |
| 5,389,911 A | * | 2/1995 | Madau .................. 340/426.27 |
| 5,463,371 A | * | 10/1995 | Fuller .................... 340/426.27 |
| 5,627,509 A | * | 5/1997 | Gajewski et al. ......... 340/426.27 |
| 6,922,137 B1 | * | 7/2005 | Bycroft ................... 340/425.5 |
| 7,155,981 B2 | * | 1/2007 | Matsuura et al. .............. 73/781 |
| 2003/0001724 A1 | * | 1/2003 | Willats et al. .............. 340/5.72 |
| 2003/0034896 A1 | * | 2/2003 | Dobson ...................... 340/665 |
| 2003/0222758 A1 | * | 12/2003 | Willats et al. .............. 340/5.72 |

FOREIGN PATENT DOCUMENTS

| | | |
|---|---|---|
| JP | 3531474 | 3/2004 |
| JP | 2004-155251 | 6/2004 |
| JP | 2005-043217 | 2/2005 |
| JP | 2005-132681 | 5/2005 |
| JP | 2006213076 A * | 8/2006 |

* cited by examiner

*Primary Examiner*—Lisa M Caputo
*Assistant Examiner*—Punam Patel
(74) *Attorney, Agent, or Firm*—Finnegan, Henderson, Farabow, Garrett & Dunner, LLP

(57) ABSTRACT

A glass breakage detecting sensor includes a strain detecting portion by which breakage of a window glass, which is provided at a door of a vehicle, is detected based on changes of an amount of strain, and an attaching portion attached to at least one of an opening and closing mechanism, which freely movably supports the window glass, and an inner panel to which the opening and closing mechanism is arranged within the door, the opening and closing mechanism and the inner panel functioning as an attached portion.

17 Claims, 6 Drawing Sheets

Existent: differences of Heights between the lower washers exist

Not existent: differences of heights between the lower washers do not exist

Existent: differences of Heights between the lower washers exist

Not existent: differences of heights between the lower washers do not exist

GLASS BREAKAGE DETECTING SENSOR

CROSS REFERENCE TO RELATED APPLICATIONS

This application is based on and claims priority under 35 U.S.C. § 119 to Japanese Patent Application 2006-210434, filed on Aug. 2, 2006, and to Japanese Patent Application 2007-106638, filed on Apr. 14, 2007, the entire contents of which are incorporated herein by reference.

FIELD OF THE INVENTION

The present invention relates to a glass breakage detecting sensor with which breakage of a window glass at a door of a vehicle is detected.

BACKGROUND

A known glass breakage detecting sensor for a window glass is disclosed in JP3531474B. The breakage detecting sensor is provided at a door of a vehicle in order to detect breakage of a window glass. The breakage detecting sensor includes a carrier plate for supporting the window glass, a coil spring for biasing the carrier plate towards the window glass in an upward direction, a stopper pin fixed on the window glass and engaged with an engaging portion of the door when the window glass is raised to fully close a window, and a limit switch for outputting a signal when the carrier plate is moved a pre-determined distance.

When the window glass is broken, the stopper pin of the window glass is disengaged from the engaging portion of the door. Therefore, the carrier plate is moved further upwards by the biasing force of the coil spring. When the carrier plate moves upwards for a pre-determined distance, the limit switch outputs a signal. Hence, the breakage of the window glass is detected when the signal is outputted from the limit switch.

However, in the known glass breakage detecting sensor for a window glass disclosed in JP3531474B, for example, the stopper pin of the window glass may not completely disengage from the engaging portion of the door depending on the way the window glass is broken, which may result in the carrier plate, which supports the window glass, not moving sufficiently. Hence, the signal is not outputted from the limit switch and the breakage of the window glass may not be detected.

A need thus exists to provide a glass breakage detecting sensor that is not susceptible to the drawback mentioned above.

SUMMARY OF THE INVENTION

According to an aspect of the present invention, a glass breakage detecting sensor includes a strain detecting portion by which breakage of a window glass, which is provided at a door of a vehicle, is detected based on changes of an amount of strain, and an attaching portion attached to at least one of an opening and closing mechanism, which freely movably supports the window glass, and an inner panel to which the opening and closing mechanism is arranged within the door, the opening and closing mechanism and the inner panel functioning as an attached portion.

According to another aspect of the present invention, a glass breakage detecting sensor includes a strain detecting portion by which strain of an attached portion is detected, and the strain detecting portion being attached to at least one of an opening and closing mechanism, which freely movably supports a window glass provided at a door of a vehicle, and an inner panel to which the opening and closing mechanism arranged within the door, the opening and closing mechanism and the inner panel functioning as an attached portion and a breakage determining portion by which breakage of the window glass is determined on the basis of changes of an amount of strain generated on the attached portion detected by the strain detecting portion, the amount of the strain being detected by the strain detecting portion.

According to a further aspect of the present invention, a glass breakage detecting sensor includes a strain generating body generating strain in cooperation with an attached portion when a window glass is raised to fully close a window, a strain generating body is attached to at least one of an opening and closing mechanism, which freely movably supports the window glass provided at a door of a vehicle, and an inner panel to which the opening and closing mechanism arranged within the door, the opening and closing mechanism and the inner panel functioning as an attached portion, a strain detecting portion outputting a detecting signal indicating an amount of strain generated on the strain generating body, a first fixing portion provided on one end portion of the strain generating body and a second fixing portion provided on the other end portion of the strain generating body for fixing the strain generating body with the attached portion and restraining means for restraining a strain direction by which, when the window glass is lowered, the strain generating body is preliminarily strained to a direction of the strain generating body being strained when the window glass is raised to fully close the window.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

An embodiment of the present invention will be explained in accordance with FIG. 1 to FIG. 8 of the attached drawings.

[Configuration of the Door 1 of the Vehicle]

Figure 1A:
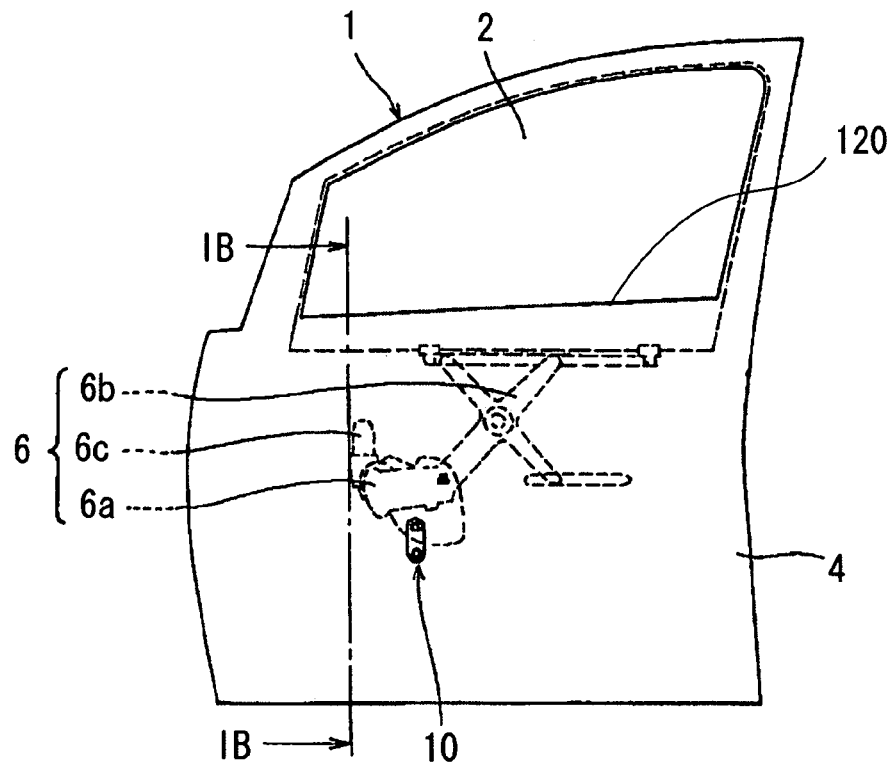
FIG. 1A shows a front view of a door of a vehicle schematically indicating arrangement of the glass breakage detecting sensor of one example of the embodiment of the present invention.
Figure 1B:
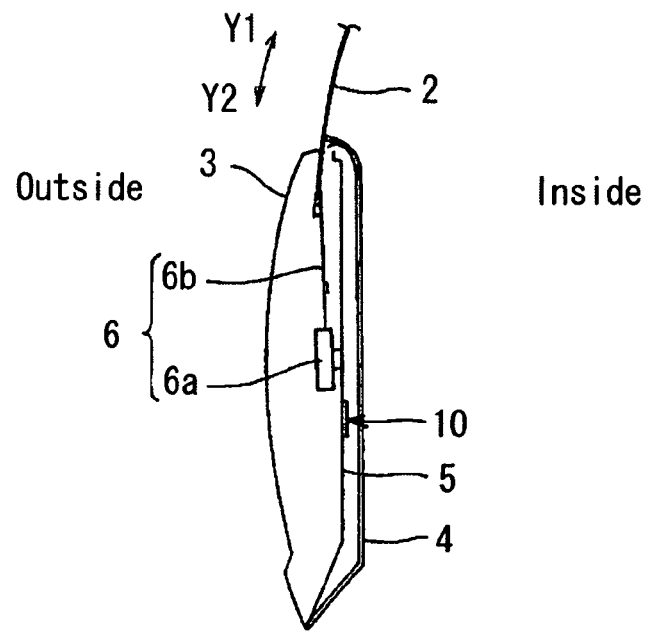
FIG. 1B shows a cross-sectional diagram of the glass breakage detecting sensor taken along line IB-IB of FIG. 1A.

As shown in FIG. 1A and FIG. 1B, a window glass 2 is arranged at a vehicle door (door) 1 as a detecting object for breakage. The door 1 includes an outer panel 3 arranged at the outermost of the door 1 of the vehicle, an interior panel 4 arranged at a room side of the vehicle and an inner panel 5 (e.g., an attached portion) arranged therebetween. Each of the outer panel 3 and the inner panel 5 is made of a steel plate or the like. The outer panel 3 forms an exterior appearance of the vehicle. The interior panel 4 is made of resin or the like. The inner panel 5 is arranged in a space formed by the outer panel 3 and by the interior panel 4 so that the inner panel is not exposed to the outside. In a space formed by the outer panel 3 and the interior panel 4, the window glass 2 slidably moves upwards and downwards (in directions of arrows Y1 and Y2 in FIG. 1B) by means of a power window regulator 6 (here onward referred to as PWR 6) provided at an upper portion of the inner panel 5 as an opening and closing mechanism (e.g., an attached portion). In other words, the window glass 2 is a movable glass and opens/closes a window 120 (an opened portion formed at the door) by the window glass moving in a sliding direction.

Figure 5A:
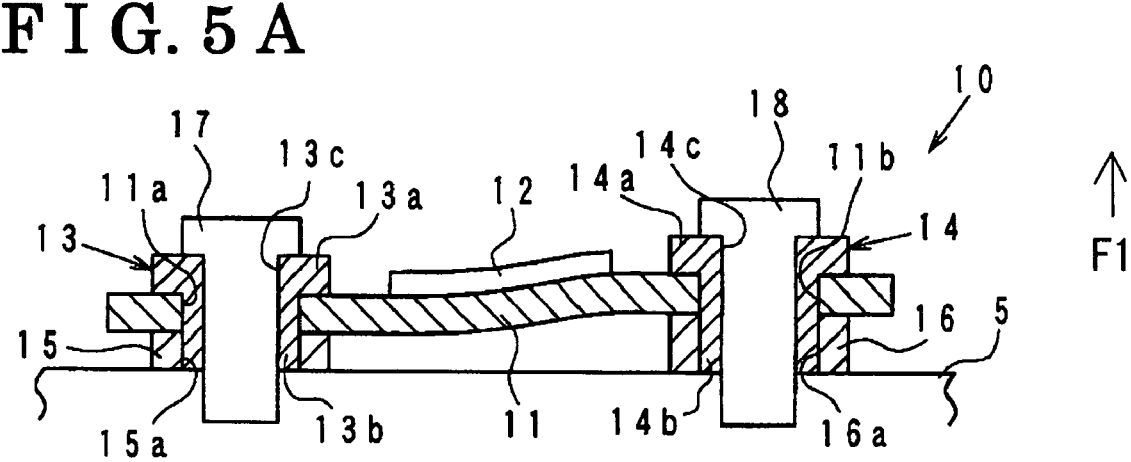
FIG. 5A shows a cross-sectional diagram illustrating the constitution of the glass breakage detecting sensor of the embodiment.
Figure 5B:
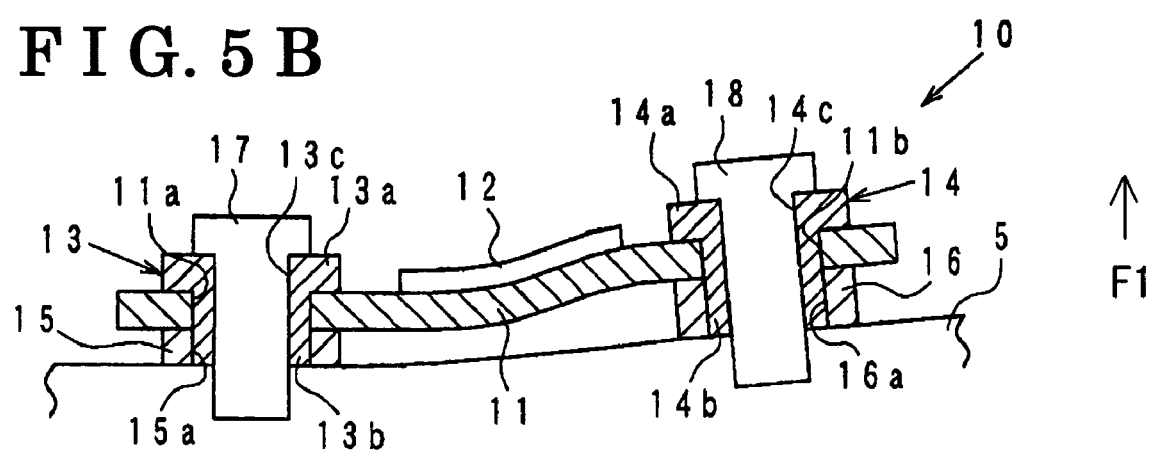
FIG. 5B shows a cross-sectional diagram illustrating a state of the glass breakage detecting sensor when an inner panel is strained.

The door 1 is configured to hold a bottom portion of the window glass 2 when the window glass 2 moves up to an upper limit position (when the window glass 2 is raised to fully close the window 120). The bottom portion of the window glass 2 is supported by the PWR 6. More specifically, as shown in FIG. 1A, the PWR 6 includes a motor 6c, a body portion 6a fixed at an approximate central portion of the inner panel 5 together with the motor 6c, and an X-shaped arm 6b pivotally supported by the body portion 6a and supporting the bottom portion of the window glass 2. The X-shaped arm is configured with two arms being movably fixed together. The PWR 6 drives the motor 6c based on an operating signal transmitted from an operating portion (not shown), followed by the X-shaped arm 6b being driven by a driving force transmitted from the motor 6c in order to move the window glass 2 upwards or downwards. When the window glass 2 is operated to automatically close the window 120, the PWR 6 continuously drives the motor 6c for a certain period of time after the window glass 2 is moved up to the upper limit to fully close the window 120, and then the PWR 6 ends a closing operation by applying pressures to the window glass 2 in an upwards direction. When the window glass 2 is lowered to open the window 120, as shown in FIG. 5A for example, the inner panel 5 is not strained. However, when the window glass 2 is raised to fully close the window 120, as shown in FIG. 5B for example, the inner panel 5 is strained in the direction of an arrow F1 by the stress applied to the window glass 2.

[Configuration of Glass Breakage Detecting Sensor 10]

As shown in FIG. 1B, a glass breakage detecting sensor 10 is arranged at a position lower than where the PWR 6 is placed on the inner panel 5. The glass breakage detecting sensor 10 may be more suitable to be arranged at a deformable place of the inner panel 5 where the inner panel 5 is easily strained when the window glass 2 is raised to fully close the window 120. In this embodiment, the body portion 6a of the PWR 6 is arranged directly below the PWR 6. More specifically, as shown in FIG. 5B, the glass breakage detecting sensor 10 is arranged at the position where the inner panel 5 is strained in the direction of the arrow F1 when the window 120 is fully closed by means of the window glass 2.

Figure 2:
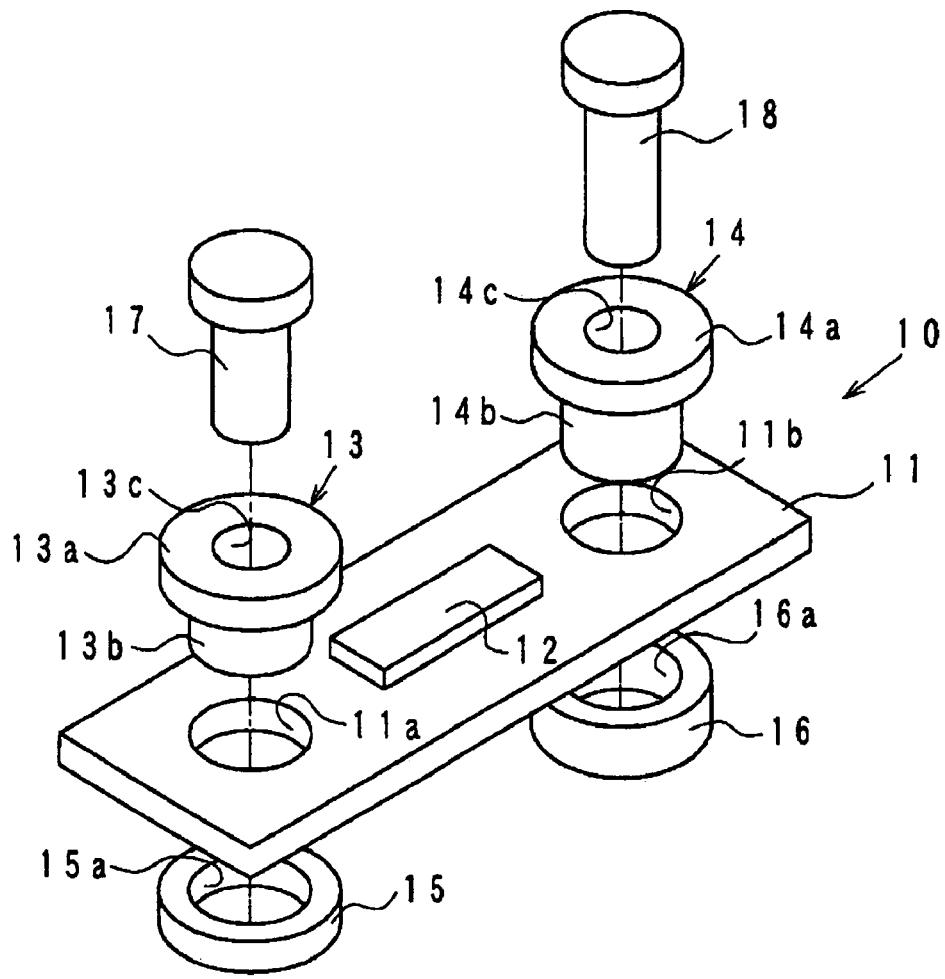
FIG. 2 shows an exploded perspective view illustrating the schematic construction of the glass breakage detecting sensor of the embodiment.
Figure 3:
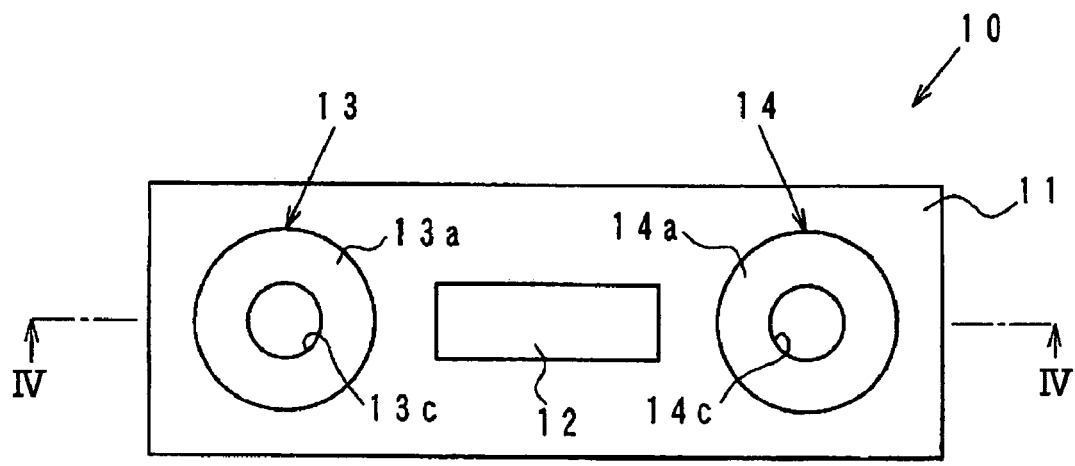
FIG. 3 shows a plan view of the glass breakage detecting sensor of the embodiment.

As shown in FIG. 2 and FIG. 3, the glass breakage detecting sensor 10 includes a strain generating body 11 (an attaching portion) formed in an approximate rectangular shape in a plain view, a strain detecting portion 12 provided at an approximate central portion on one surface of the strain generating body 11 (on the upper surface in FIG. 2), first and second upper washers 13 and 14 and first and second lower washers 15 and 16 provided at upper and lower surfaces of the strain generating body 11 respectively as fixing portions.

Through holes 11a and 11b are provided at each approximate end portion in a longitudinal direction of the strain generating 11 respectively, and the strain detecting portion 12 is fixed therebetween. The strain detecting portion 12 includes a plurality of strain detecting elements, such as strain gauges. In this embodiment, the strain detecting portion 12 includes two strain detecting elements. Further, the strain detecting portion 12 outputs an electrical signal based on an amount of strain generated on the strain generating body 11.

The first upper washer 13 is inserted into the through hole 11a and the second upper washer 14 is inserted into the through hole 11b. Then, the first lower washer 15 is attached to the bottom portion of the first upper washer 13 and the second lower washer 16 is attached to the bottom portion of the second upper washer 14.

Figure 4:
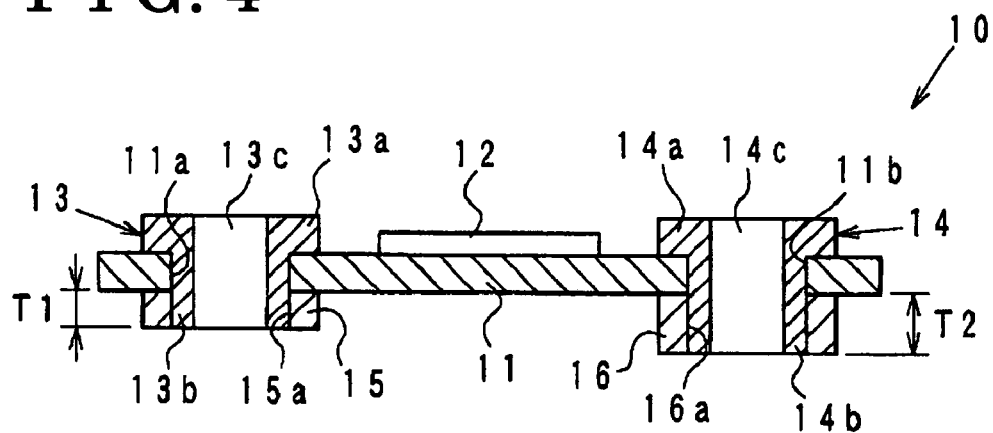
FIG. 4 shows a cross-sectional diagram of the glass breakage detecting sensor taken along line IV-IV of FIG. 3.

More specifically, each of the upper washers 13 and 14 are formed in an approximate cylindrical shape. At upper portions of the upper washers 13 and 14, flange portions 13a, 14a are formed respectively. The outer diameters of the flange portions 13a, 14a are formed larger than that of the through holes 11a, 11b. On bottom portions of the upper washers 13 and 14, inserting portions 13b and 14b are formed respectively. The outer diameters of the inserting portions 13b, 14b are formed to be equal to or slightly smaller than the diameters of the through holes 11a, 11b. Additionally, the length of the first inserting portion 13b is set to be equal to a combined thickness of the strain generating body 11 and the first lower washer 15. Similarly, the length of the second inserting portion 14b is formed set to be equal to a combined thickness of the strain generating body 11 and the second lower washer 16. On the other hand, each of the lower washers 15 and 16 is formed in an approximate cylindrical shape, and their height differ from each other. The lower washers 15 and 16 have through holes 15a, 16a respectively, whose inner diameters are equal to the diameter of the through holes 11a, 11b. As shown in FIG. 4, in this embodiment, the height of the second lower washer 16 is formed to be higher than that of the first lower washer 15. The height of the first lower washer 15 is referred to as T1 and that of the second lower washer 16 is referred to as T2. The relationship between the T1 and T2 is described as follows: T1<T2. Each of the washers 13, 14, 15 and 16 are attached to the strain generating body 11 in a manner where each of the inserting portions 13b and 14b being inserted into each of the through holes 11a and 11b respectively, and then each of the lower washers 15 and 16 being attached to the bottom portions of each of the inserting portions 13b and 14b respectively. Hence, in this embodiment, the washers 13 and 15 function as a first fixing portion and the washers 14 and 16 function as a second fixing portion.

[An Aspect of Arrangement of the Glass Breakage Detecting Sensor 10 and an Operation of Detecting Breakage of the Glass]

As shown in FIG. 5A and FIG. 5B, the glass breakage detecting sensor 10, whose configuration is described above, is fixed at the inner panel 5 by means of connecting members 17 and 18, such as bolts or the like. More specifically, the glass breakage detecting sensor 10 is fixed to the inner panel 5 by means of the connecting member 17 being inserted into a through hole 13c of the first upper washer 13, and similarly by the connecting member 18 being inserted into a through hole 14c of the second upper washer 14, as a result, the panel 11 is connected to the inner panel 5.

Therefore, the first lower washer 15 and the second lower washer 16 are interposed between the strain generating body 11 and the inner panel 5. As shown in FIG. 5A, even when the inner panel 5 is not strained, in other words, even when the window glass 2 is lowered to open the window 120, the strain generating body 11 is strained in the F1 direction indicated in the FIG. 5A because the heights of each of the lower washers 15 and 16 differs from each other. Therefore, the strain detecting portion 12 always detects strain of the strain generating body 11 in a downward compressed direction of the inner panel 5 and outputs the electrical signal (the detecting signal) based on the amount of strain generated on the strain generating body 11.

Moreover, as shown in FIG. 5B, in accordance to the window glass 2 being raised to fully close the window 120, the inner panel 5 is strained in the F1 direction, which results in the strain generating body 11 subsequently being further strained in the same direction. Therefore, the strain detecting portion 12 detects further strain of the strain generating 11 in the downward compressed direction of the inner panel 5, and then the strain detecting portion 12 outputs the detecting signal based on the amount of strain generated on the strain generating body 11. By interposing the of lower washers 15 and 16, whose heights are formed differently, and further which are formed between the strain generating body 11 and the inner panel 5, the strain generating body 11 is preliminarily strained in one direction in order to regulate the direction of the strain generating body 11 being further strained or loosed in accordance to the opening and closing operation. Hence, the lower washers 15 and 16 function as restraining means for restraining a strain direction.

As a result, the strain detecting portion 12 outputs different detecting signals depending on whether or not the inner panel 5 is strained. More specifically, the strain detecting portion 12 outputs the electrical signal as the detecting signal. The electrical signal indicate the total amount of differences of strain, which is detected by each of the strain detecting gauges. The total amount of differences of strain detected by the strain detecting gauges indicates differences between the electrical signals gained by each of the strain detecting gauges. The more the strain generating 11 is strained, the larger amount of the total differences is reflected on the detecting signal outputted by the strain detecting portion 12. Similarly, the less the strain generating body 11 is strained, the less amount of the total difference is reflected on the detecting signal outputted by the strain detecting portion 12.

Figure 6A:
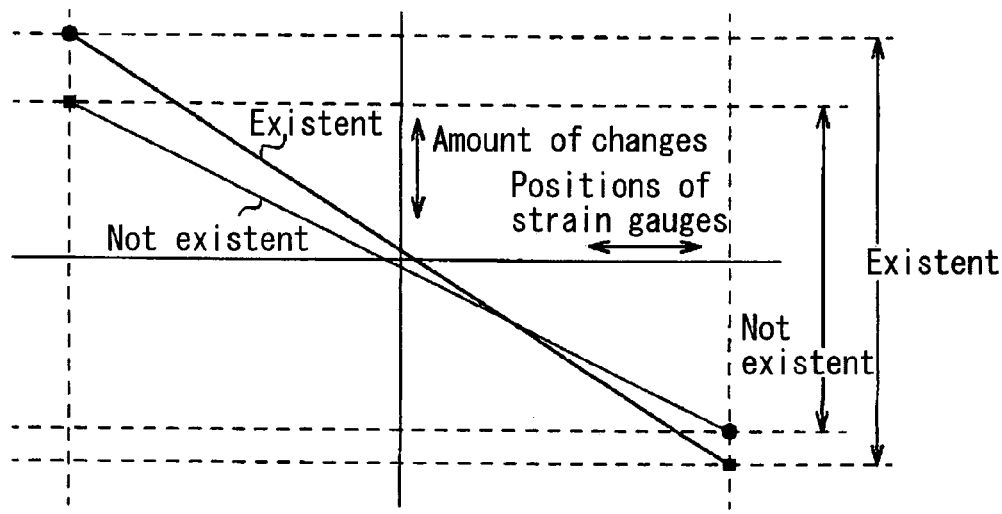
FIG. 6A and FIG. 6B show a comparative example of a glass breakage detecting portion detecting the strain.
Figure 6B:
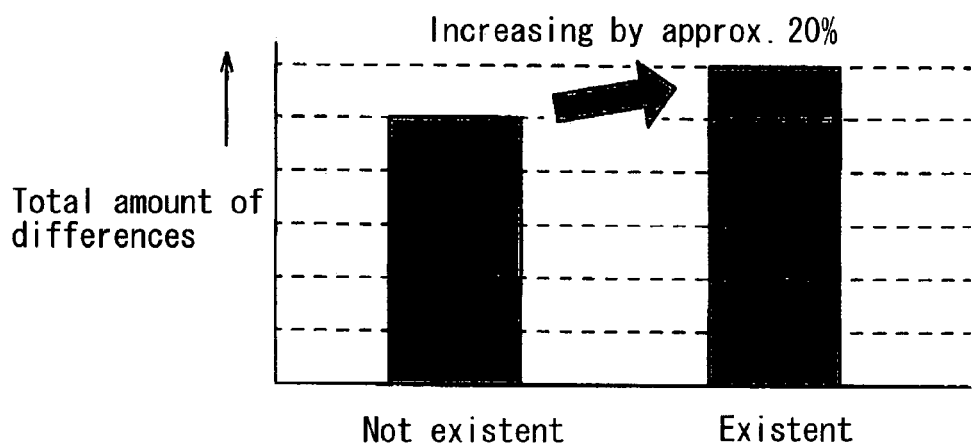

Incidentally, as shown in FIG. 6A, when the window glass 2 is raised to fully close the window 120, and additionally when the differences between the heights of the first and the second lower washers 15 and 16 exist ('existent' as shown in FIG. 6A), the total amount of differences of strain becomes larger than in a case where the height of the first and the second lower washers 15 and 15 are set to be equal ('not existent' as shown in FIG. 6A). Particularly, as shown in FIG. 6B, empirical tests showed that when the total difference of heights between the first and the second lower washers 15 and 16 is set to 1.5 mm, the total amount of the differences of strain when the window 120 is fully closed with the window glass 2 increases by approximately 20% comparing to a case where the heights of the first and second lower washers 15 and 16 are set to be equal.

Figure 7:
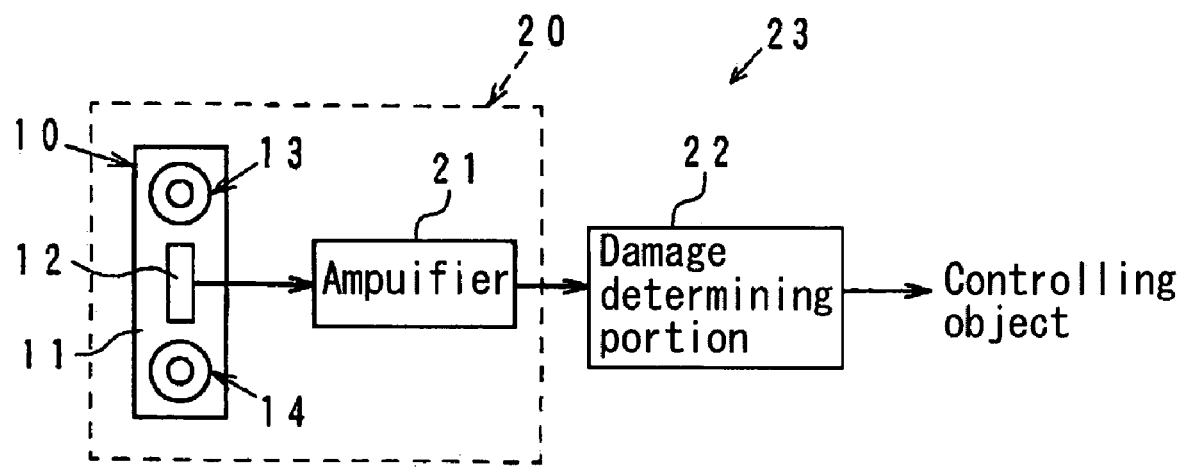
FIG. 7 shows a block diagram illustrating a schematic construction of a glass breakage detecting device of the embodiment.
Figure 8:
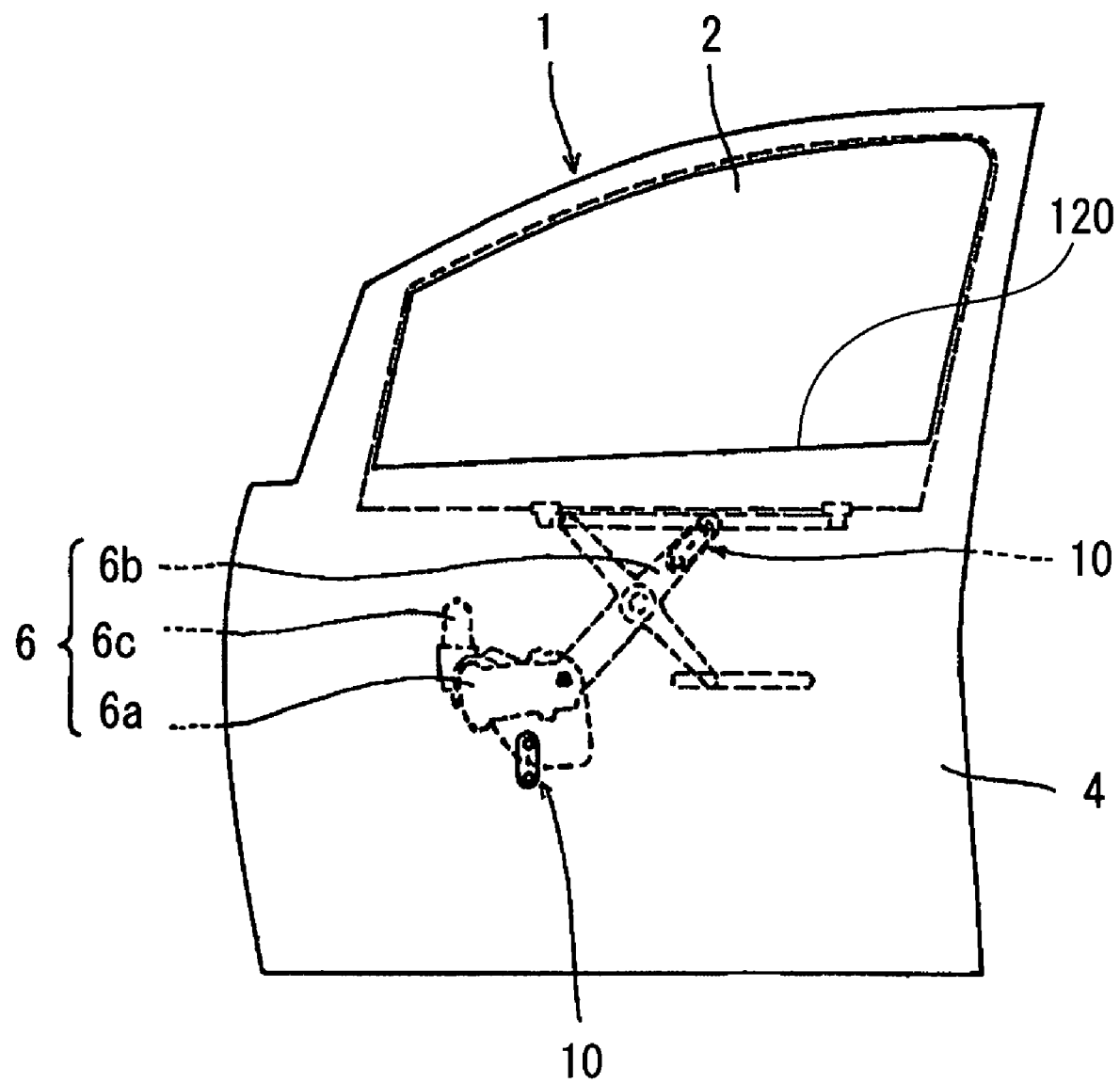
FIG. 8 shows a front view of a modified embodiment.

Additionally, as shown in FIG. 7, the glass breakage detecting sensor 10 and an amplifier 21, which is electrically connected to the strain detecting portion 12, are set together to form a breakage detecting structure 20. The amplifier 21 is electrically connected to the strain detecting portion 12, amplifies the detecting signal outputted from the strain detecting portion 12 and then outputs the amplified detecting signal to a breakage determining portion 22. The amplifier 21 is formed to be connectable to an external device at its output terminal. The glass breakage detecting sensor 10, the amplifier 21 and the breakage determining portion 22, which is electrically connected to the output terminal of the amplifier 21, are set together to from a glass breakage detecting device 23. The breakage determining portion 22 determines that the window glass 2 is broken based on the signal outputted by the amplifier 21. More specifically, the breakage determining portion 22 determines that the window glass 2 is broken when a value of the detecting signal gained when the window glass 2 is raised to fully close the window 120 has changed to a value of the detecting signal gained when the window glass 2 is lowered even though the window glass 2 is not operated to open the window 120. In other words, the breakage determining portion 22 determines that the window glass 2 is broken when the amount of strain generated on the strain generating body 11 under a condition where the window glass 2 is raised to fully close the window 120 is decreased, even when the window glass 2 is not operated to open the window 120. Then, the breakage determining portion 22, for example, outputs an actuating signal to a controlling object such as an alarm unit or the like when the breakage determining portion 22 determines that the window glass 2 is broken. Therefore, the vehicle may be controlled based on with or without breakage on the window glass 2.

According to the embodiment of the present invention, detection of the strain of the inner panel 5 generated in accordance to the closing operations is assured because the detecting signal outputted from the strain detecting portion 12 changes based on the amount of strain generated on the strain generating body 11. The amount of strain generated on the strain generating body 11 increases in accordance to the window glass 2 being raised to fully close the window 120. In a case where the window glass 2 is broken when the window 120 is fully closed by the window glass 2, the amount of the strain of the inner panel 5 is decreased. Therefore, by using the glass breakage detecting sensor 10, breakage of the window glass 2 is detected based on changes of the amount of the strain of the strain generating body 11 occurring when the window glass is raised to fully close the window 120.

According to the embodiment of the present invention, the strain detecting portion 12 is attached to the inner panel 5 via the panel 11. Therefore, by assembling the strain detecting portion 12 and the strain generating body 11 as a unit, the glass breakage detecting sensor 10 is effectively and easily mounted to the door 1.

According to the embodiment of the present invention, the surface of the inner panel 5 facing the inside of the vehicle is kept dust-proof and waterproof. Therefore, the surface of the inner panel 5 facing the inside of the vehicle is a preferable place to provide the strain detecting portion 12 thereon.

According to the embodiment of the present invention, even when the window glass 2 is lowered to open the window 120, by providing the first and the second lower washer 15 and 16, the strain generating body 11 is strained to the direction of the inner panel 5 being further strained when the window glass 2 is raised to fully close the window 120. Then, when the window 120 is fully closed with the window glass 2, the strain generating body 11 is further strained in the pre-strained direction, in accordance to the inner panel 5 being strained. In other words, the direction of the strain generating body 11 being strained is regulated to one direction. Therefore, when the window glass is lowered, the strain generating body 11 is prevented from being strained to the opposite direction from the direction the strain generating body 11 is loosened when the window glass 2 is raised to fully close the window 120. As a result, the strain generating body 11 is adequately prevented from receiving stress from other directions. Hence, decreases of durability of the strain generating body 11 generated by the stress are prevented.

According to the embodiment of the present invention, the direction of the strain generating body 11 being strained is easily regulated by interposing the first and the second lower washers 15 and 16, whose heights differ from each other, and further by interposing the first and the second lower washers 15 and 16 with different heights between the inner panel 5 and the strain generating body 11. Additionally, the straining direction of the strain generating body 11 is regulated to one direction by changing the heights of the first and the second lower washers 15 and 16 depending on where the strain generating body 11 is provided on the inner panel 5.

According to the embodiment of the present invention, the strain detecting portion 12 includes two strain gauges (strain detecting elements). Therefore, changes of the strain of the strain generating body 11 in accordance to the opening and closing operation of the window glass 2 is individually detected with each of the strain gauges. Then the strain detecting portion 12 outputs the electrical signal as the detecting signal. The electrical signal indicates the total amount of differences of the strain, which is generated on the strain generating body 11, detected by the strain detecting elements. Therefore, when the strain detecting portion 12 includes two strain gauges, the changes of the strain of the strain generating body 11 is detected more accurately comparing to a case where the strain detecting portion 12 is configured with only one strain gauge.

According to the embodiment of the present invention, on the inner panel 5, more stress in a compressed direction is applied to a part lower than the position where the PWR 6 is arranged when the window 120 is fully closed by means of the window glass 5. Therefore, the lower part of the inner panel 5 is more strained than the upper part of the inner panel 5 when the window glass 2 is raised to fully close the window 120. Hence, by providing the glass breakage detecting sensor 10 to the lower part of the inner panel 5, the strain of the inner panel in accordance to the opening and closing operation of the window glass 2 is accurately detected.

The embodiment may be modified as follows.

The height of the first washer 15 is not necessarily set differently from the height of the second washer 16, but the heights of the both washers 15 and 16 may be set to be equal. Additionally, the strain detecting portion 12 is not necessarily provided to the inner panel 5 via the strain generating body 11, but the strain detecting portion 12 may be provided to the inner panel 5 directly. In this case, the washers 13, 14, 15 and 16 may not be provided. Moreover, in this case, an attaching part of the strain detecting portion 12 to an attached portion of the inner panel 5 functions as the attaching portion.

The glass breakage detecting sensor 10 is not necessarily provided at the part lower than the position where the PWR 6 is arrange on the inner panel 5, but, for example, the breakage of glass detecting sensor 10 may be arranged at a position higher than where the PWR 6 is provided. Additionally, the glass breakage detecting sensor 10 is not necessarily provided at the inner panel 5, but, for example, the glass breakage detecting 10 may be provided at the X-shaped arm 6b of the PWR 6. In this case, the breakage of the window glass 2 is detected based on the amount of the strain generated on the X-shaped arm 6b in accordance to the opening and closing operation of the window glass 2. In other words, the glass breakage detecting sensor 10 may be provided anywhere the amount of the strain changes between when the window glass 2 is raised to fully close the window 120 and when the window glass 2 is lowered. Further, the glass breakage detecting sensor may be provided at both of the inner panel 5 and the X-shaped arm 6b. The stiffness in vicinity of the central portion of the inner panel 5 is lower than the other part of the inner panel 5. Hence, in a case where the glass breakage detecting sensor 10 is provided at the inner panel 5, the vicinity of the central portion of the inner panel 5 or anywhere at the inner panel 5 with lower stiffness are preferable places to provide the breakage detecting sensor 5.

The strain detecting portion 12 is not necessarily provided at the surface of the strain generating body 11 where the first upper washer 13 and the second upper washer 14 are provided, but the strain detecting portion 12 may be arranged at the surface of the strain generating body 11 where the first lower washer 15 and the second lower washer 16 are provided. In this case, the strain detecting portion 12 detects strain in pulling direction of the strain generating body 11, and as in the case of the embodiment described above, the strain of the strain generating body 11 is accurately detected.

The strain detecting portion 12 does not necessarily include two strain gauges (the strain detecting elements), but the strain detecting portion 12 may includes only one strain gauge or more than two.

The glass breakage detecting sensor 10, the amplifier 21 and the breakage determining portion 22 may be structured to be one unit. In other words, the glass breakage detecting device 23 may be configured as one structure. In other words, the glass breakage detecting sensor 10 may serves as the glass breakage detecting device 23.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A glass breakage detecting apparatus, comprising:
   a strain gage including an attaching portion and a strain detecting portion,
   the attaching portion being attached to an attached portion, the attached portion being at least one of an opening and closing mechanism, which freely movably supports a window glass within a door, and an inner panel of the door to which the opening and closing mechanism is arranged within the door;
   the strain detecting portion for detecting a change in strain at the attaching portion; and
   a glass breakage detecting device determining whether or not a breakage of the window glass occurs on the basis of the change in strain detected by the strain detecting portion while the opening and closing mechanism is being inactive.

2. The glass breakage detecting apparatus according to claim 1, wherein the opening and closing mechanism includes an arm movably supported by the inner panel and the arm being moved in conjunction with the window glass, the arm serving as the attached portion.

3. The glass breakage detecting apparatus according to claim 1, wherein the attaching portion includes a strain generating body for generating a strain in cooperation with the attached portion, and the strain detecting portion is provided on the strain generating body.

4. The glass breakage detecting apparatus according to claim 1, wherein the attached portion is a surface of the inner panel facing inside of the vehicle.

5. The glass breakage detecting apparatus according to claim 1, wherein the attaching portion includes a strain generating body on which the strain detecting portion is provided and is strained together with the attached portion, and further the attaching portion is attached to the inner panel facing inside of the vehicle.

6. The glass breakage detecting apparatus according to claim 1, wherein the attaching portion is attached to a position lower than the position where the opening and closing mechanism is provided on the inner panel.

7. The glass breakage detecting apparatus according to claim 1, wherein the attaching portion includes:
- a strain generating body to which the strain detecting portion is provided and is strained in cooperation with the attached portion;
- a first fixing portion provided at one end portion of the strain generating body and a second fixing portion provided at the other end portion of the strain generating body, the attaching portion of the strain generating body being fixed to the attached portion on the inner panel by the first and the second fixing portions; and
- restraining means for restraining the strain generating body such that straining directions of the strain generating body when the window glass is opened and closed, respectively, are made same.

8. The glass breakage detecting apparatus according to claim 7, wherein the first and the second fixing portions include a plurality of washers which are interposed between the strain generating boy and the attached portion, and further the first and the second fixing portions include the restraining means for restraining a strain direction structured with the plurality of washers of different heights.

9. The glass breakage detecting apparatus according to claim 8, wherein the glass breakage detecting sensor is arranged at a position lower than the position where the opening and closing mechanism is provided.

10. The glass breakage detecting apparatus according to claim 7, wherein the strain detecting portion includes a plurality of strain detecting elements, and further the strain detecting portion outputs an electrical signal detected by the plurality of the strain detecting elements as a detecting signal, the electrical signal indicates an amount of differences of strain generated on the strain generating body.

11. The glass breakage detecting apparatus according to claim 10, wherein the glass breakage detecting sensor is arranged at a position lower than the position where the opening and closing mechanism is provided.

12. The glass breakage detecting apparatus according to claim 7, wherein the glass breakage detecting sensor is arranged at a position lower than the position where the opening and closing mechanism is provided.

13. The glass breakage detecting apparatus according to claim 1, wherein each of the opening and closing mechanism and the inner panel of the door is the attached portion for being attached to the attaching portion of the strain gage.

14. The glass breakage detecting apparatus according to claim 1, wherein whether or not a breakage of the window glass occurs is determined while the window glass is being in held in place.

15. The glass breakage detecting apparatus according to claim 1, wherein whether or not a breakage of the window glass occurs is determined while the window glass is in its fully closed condition.

16. A glass breakage detecting apparatus, comprising:
- a strain detecting portion by which strain of an attached portion is detected, and the strain detecting portion being attached to at least one of an opening and closing mechanism, which freely movably supports the window glass within a door, and an inner panel to which the opening and closing mechanism is arranged within the door, the opening and closing mechanism and the inner panel functioning as an attached portion; and
- a breakage determining portion determining a breakage of the window glass on the basis of a change in strain generated on the attached portion detected by the strain detecting portion while the opening and closing mechanism is being inactive.

17. A glass breakage detecting apparatus, comprising:
- a strain generating body generating strain in cooperation with an attached portion when a window glass is raised to fully close a window, a strain generating body is attached to at least one of an opening and closing mechanism, which freely movably supports the window glass provided at a door of a vehicle, and an inner panel to which the opening and closing mechanism arranged within the door, the opening and closing mechanism and the inner panel functioning as an attached portion;
- a strain detecting portion outputting a detecting signal indicating an amount of strain generated on the strain generating body while the opening and closing mechanism is being inactive;
- a first fixing portion provided on one end portion of the strain generating body and a second fixing portion provided on the other end portion of the strain generating body for fixing the strain generating body with the attached portion; and
- restraining means for restraining the strain generating body such that straining directions of the strain generating body when the window glass is opened and closed, respectively, are made same.

* * * * *

UNITED STATES PATENT AND TRADEMARK OFFICE
CERTIFICATE OF CORRECTION

PATENT NO. : 7,656,279 B2　　　　　　　　　　　　　　　　　　　　　　　Page 1 of 1
APPLICATION NO. : 11/882487
DATED : February 2, 2010
INVENTOR(S) : Takashi Okada et al.

It is certified that error appears in the above-identified patent and that said Letters Patent is hereby corrected as shown below:

Claim 8, col. 9, line 37, "boy" should read --body--.

Signed and Sealed this

Eleventh Day of May, 2010

David J. Kappos
*Director of the United States Patent and Trademark Office*